Patented Aug. 17, 1954

2,686,770

UNITED STATES PATENT OFFICE 2,686,770

DISPERSION OF FLUOROCHLOROCARBON POLYMERS

Charles D. Dipner, Jersey City, N. J., assignor to The M. W. Kellogg Company, Jersey City, N. J., a corporation of Delaware No Drawing. Application December 29, 1949, Serial No. 135,823

1 Claim. (Cl. 260—33.2)

This invention relates to dispersions of high molecular weight polymers of perfluorochlorocarbons as the monomers. In one aspect this invention relates to dispersions or suspensions of the plastic polymers of the single monomer trifluorochloroethylene. In another aspect the invention relates to a method for applying plastic polymers of trifluorochloroethylene to surfaces.

Polymers of trifluorochloroethylene possess certain physical and chemical characteristics which make the polymers particularly desirable as surface coatings and impregnants. The plastic polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of the single monomer is made of the two halogens, fluorine and chlorine. The quick quenched plastic polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The plastic polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

Solid polymer of trifluorochloroethylene

| Electrical Frequency, cycles/sec. | Dielectric Constant E | Dielectric Power Loss Tan | |
|---|---|---|---|
| $1 \times 10^1$ | 2.72 | 0.022 | 0.0011 |
| $1 \times 10^2$ | 2.63 | 0.27 | 0.0014 |
| $1 \times 10^4$ | 2.53 | 0.023 | 0.0012 |
| $1 \times 10^5$ | 2.46 | 0.0135 | 0.0008 |
| $1 \times 10^6$ | 2.43 | 0.0082 | 0.0004 |
| $1 \times 10^7$ | 2.35 | 0.0060 | 0.0003 |
| $1 \times 10^8$ | 2.30 | 0.0028 | 0.0002 |
| $3 \times 10^8$ | 2.30 | 0.0030 | |
| $3 \times 10^9$ | 2.30 | 0.0028 | 0.0002 |
| $1 \times 10^{10}$ | 2.29 | 0.0039 | 0.0002 |
| $2.5 \times 10^{10}$ | 2.29 | 0.0055 | |

Other physical properties of the plastic polymer are shown below in Table II:

TABLE II

| Property | Test Result |
|---|---|
| Specific gravity | 2.1. |
| Tensile strength at 86° F., p. s. i. | 9,400. |
| Elongation at break 86° F., percent | 127. |
| Coefficient of linear expansion (−320° F. to 167° F.) | $3.5 \times 10^{-5}$. |
| Specific resistance, ohms | $5 \times 10^{17}$. |
| Water absorption, percent | 0.00. |
| Outdoor weathering | no detectable change |

Normally solid polymers produced from the single monomer trifluorochloroethylene may be prepared by polymerizing the monomer in the presence of a suitable organic peroxide such as bistrichloroacetyl peroxide, as the polymerizing agent, at a temperature between about −20 and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the plastic polymer over the oils and waxes produced with the same monomer, the polymer is described by reference to its no strength temperature. A no strength temperature (N. S. T.) of between about 210 and about 350° C. is characteristic of a normally solid polymer of the above preparation having plastic characteristics. Best plastic characteristics of the normally solid polymer are observed at N. S. T. values between about 240 and about 340° C. The N. S. T. values of the polymer depend upon such factors as temperature, residence time, concentration of promoter, pressure, etc. Since this invention does not relate to the method of producing the polymer of particular characteristics, further discussion thereof will not be undertaken. Other applications have been filed relating to the preparation of the polymer per se.

The no strength temperature (N. S. T.) is determined in the following manner: A sample of polytrifluorochloroethylene is hot pressed into a $\frac{1}{16}''$ thick sheet and cut into a strip of $\frac{1}{8}'' \times \frac{1}{16}'' \times 1\frac{5}{8}''$. The strip is notched $\frac{5}{8}''$ from the top so that the dimension at the notch shall be $\frac{1}{16}'' \times \frac{1}{16}''$. A fine wire and a standard weight is attached to one end of the strip. The weight of the polymer plus the wire and standard weight shall equal ½ grams. The strip is then attached in furnace and fixed vertically therein. The temperature of the sample is increased at a rate of about 1½° C. per minute in the furnace as the breaking temperature is approached. The no strength temperature is the breaking temperature of the sample. Differences of about 5° C. are considered significant.

As a result of the excellent chemical and physical properties of the polymers of trifluorochloroethylene the polymers have use as coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The polymer may be applied to various surfaces, including flat and curved surfaces, wires, fabrics, yarn, paper, leather, cables, cans, glass, wood, cork, etc. The polymer may be applied to metal wires, particularly aluminum, iron and copper, to act as an insulator on the surface of the wires. The coating of fabrics with polytrifluorochloroethylene renders the fabrics fire proof and shrink resistant and increases the strength of the fabrics. Heretofore the normally solid polymer has been applied to the surface by melting the polymer and applying it to the surface, such as by extrusion, or by dissolving the solid polymer in a suitable solvent, coating the surface with the solvent and subsequently evaporating the solvent. Applying the solid polymer by extrusion to the surfaces has certain obvious disadvantages. One of these disadvantages is the fact that relatively high temperatures must be employed and at such high temperatures there is a tendency for the polymer to decompose. The decomposition of the polymer not only affects its chemical and physical characteristics, but also the products of decomposition may attack the surface which is being coated. It is also difficult to obtain thin films upon the surface when applying the polymer by extrusion, the use of thin films being highly desirable in coating wires used, for example, as armatures of motors. The solution method of application also has certain disadvantages. The substantial insolubility of the polymer in most solvents and its high viscosity with low solids content in other solvents makes this method somewhat impractical. Those solvents which have been found useful for dissolving plastic polytrifluorochloroethylene are relatively expensive which necessitates their recovery after evaporation. The solvents may also be corrosive to the surface being coated at the condition of application. The relatively high viscosity of solutions of plastic polytrifluorochloroethylene also makes their application difficult and the solutions must usually be applied at substantially elevated temperatures.

It is an object of this invention to form stable dispersions of the plastic polymer of polytrifluorochloroethylene.

Another object of this invention is to provide a method for applying plastic polymers of trifluorochloroethylene to solid surfaces.

Still another object of this invention is to provide a method and material for dispersing plastic polymers of trifluorochloroethylene in such a form that it may be applied to surfaces with a minimum of application difficulties.

Another object of this invention is to provide a relatively inexpensive method for applying the plastic polymer of trifluorochloroethylene to surfaces.

Another object of this invention is to provide a dispersion of plastic polymer of trifluorochloroethylene in high concentrations and low viscosities in a liquid medium.

Various other objects and advantages of the present invention will become apparent to those skilled in the art.

According to this invention, the powdered plastic polymer of trifluorochloroethylene is directly dispersed or suspended in a liquid medium comprising a glycol or a derivative thereof. Suitable glycols or glycol derivatives, useful as dispersants, comprise ethylene glycol, propylene glycol, di- and tri-ethylene glycol, dipropylene glycol, ethylene glycol, ethyl ether and dioxane. The concentration of solid polymer in the liquid medium comprising a glycol ranges between about 10 and about 30 per cent by weight, usually in a particle size of about 0.1 to about 10 microns. In addition to the dispersant glycol, the liquid dispersing medium may include a diluent. In general, suitable diluents comprise water and alcohols. With the glycol ethers and dioxane, aliphatic and aromatic hydrocarbons boiling between 75-200° C. may be used. The weight ratio of glycol dispersant to diluent is in the range of about 2:1 to about 1:25, preferably in the range of about 1:2 to 1:10, depending upon the particular diluent and glycol or glycol ether used.

It is sometimes desirable in making up the dispersion or suspension to include a suitable plasticizer for the polytrifluorochloroethylene polymer. In this manner the ultimate film obtained is more resilient and pliant, with less tendency for the film to tear. Such plasticizers comprise normally liquid and waxy polymers of trifluorochloroethylene polymer. The liquid and wax polymers of trifluorochloroethylene are produced in a similar manner as described with regard to the production of normally solid polymers of trifluorochloroethylene. In general, the waxes and liquid polymers are obtained at higher temperatures and with greater concentrations of promoter than employed in the manufacture of normally solid polymers. Examples of other plasticizers which may be incorporated with the dispersing medium comprise dioctyl phthalate and tricresyl phosphate. The plasticizers are incorporated in the dispersing medium in substantially the same amount as the polymer, usually in the range of about 10 to 25 weight per cent of the dispersing medium, but may range as high as 75% or as low as 5% of the dispersing medium.

According to this invention, films of 0.1 to 5 mils in thickness of plastic polymer of trifluorochloroethylene may be applied to metal surfaces or the like. The plastic polymer of trifluorochloroethylene is pulverized to a sufficient extent that the powdered polymer passes an 80 mesh screen. Thereafter, the finely-divided polymer is mixed with the dispersing medium of the composition as previously described. Generally, the solid polymer is incorporated in the dispersing medium initially in an amount of 10–20 weight per cent. The mixture of solid polymer and liquid dispersing medium is then introduced into a ball mill or pebble mill for grinding. The grinding is continued for a period of at least 48 hours, usually about 96 hours or more, and thereafter an increased amount of solid polymer is introduced into the mixture during ball milling to bring the concentration of solid polymer to about 20 to 30 weight per cent. The ball milling is continued for another period of about 48 hours for each additional 3% of plastic (through an 80 mesh screen) added. Any method of grinding and pulverizing the powdered polymer may be employed without departing from the scope of this invention. Roller mills, colloid mills, gear pumps, and other conventional devices may be employed to pulverize the plastic. After sufficient ball milling, the mixture contains finely dispersed plastic polymer of about 1 micron in diameter which does not settle appreciably upon prolonged standing and has a viscosity usually less than about 150 centipoise at room temperature. Articles or surfaces may be coated by dipping into this mixture and air drying. Usually, two, three or more dips, with air drying between dips, are required to obtain the desired film thickness upon the surface of the article. After the last dip the surface containing the deposited plastic polymer thereon is heated to a temperature between about 350 and about 400° C. for 1 to 5 minutes to cause fusion and sintering of the solid powdered particles of polymer. When plasticizers are employed the temperature of fusion may be as low as 225° C. The lower temperatures of fusion are preferred since the tendency of the polymer to decompose and attack metal surfaces is minimized. If insufficient film thickness is obtained after about several applications followed by fusion, the entire procedure may be repeated until the desired film thickness is obtained. Other methods of application include spraying and painting.

The following examples are offered as a better understanding of the invention and should not be construed as unnecessarily limiting:

EXAMPLE I

Polytrifluorochloroethylene powder, 5 gms., and 45 gms. of diethylene glycol were mixed and agitated. The resulting dispersion remained stable up to 150° C. at which temperature the particles required agitation to remain completely suspended. At normal temperatures the particles settled very slowly over a period of several hours.

EXAMPLE II

Polytrifluorochloroethylene powder was added with vigorous agitation to ethylene glycol in a Waring Blendor until 15% solid, based on the total weight of the dispersion, was obtained. This dispersion was fairly fluid and the particles settled very slowly over a period of several days.

EXAMPLE III

Coarse polytrifluorochloroethylene powder when mixed with ethylene glycol ethyl ether and dioxane in a test tube showed no tendency to agglomerate but would settle very rapidly; however, these liquids can be used as dispersion mediums if stirred slowly and continuously.

The powder used in these experiments was composed of very coarse particles covering the range 420 to less than 44 microns and consisting mostly of particles larger than 44 microns. By using finer powder, greater stability and increasing the solid phase concentration are possible.

EXAMPLE IV

About 46 grams of 300 N. S. T. polytrifluorochloroethylene plastic (screen analysis indicated 66 per cent through 80 mesh) was added with stirring to a thinner consisting of 41 grams of 2,ethoxy-ethanol,1 and 186 grams of xylene. This suspension was charged to a quart size pebble-mill jar containing approximately 450 mils of flint pebbles and rotated for 139 hours. To this dispersion was added 10.5 grams of the 300 N. S. T. plastic and milling continued for 47 hours. The resultant dispersion (20 per cent plastic) was excellent but was slightly more viscous than desirable, depositing a thick film upon dipping. 4.5 grams of xylene and 1 gram of 2,-ethoxy-ethanol,1 were added, and milling continued for 38 hours. The final dispersion (19.6 per cent plastic) deposited an even film of plastic polytrifluorochloroethylene particles which fused at 380° C. to 400° C.

The present invention includes within its scope polymers of trifluorochloroethylene which include a minor amount of other monomers, such as vinyl chloride, tetrafluoroethylene, perfluoropropene and acrylonitrile. The use of these other monomers is limited to less than about 15 per cent of the polymer. In some instances it is desirable to use small quantities of other monomers in combination with the principal monomer trifluorochloroethylene in order to impart modified characteristics to the resulting polymer.

I claim:

A dispersion which comprises finely-divided particles of the plastic polymer of trifluorochloroethylene dispersed in 2,ethoxy-ethanol,1 as a dispersant and xylene as a diluent, said dispersion having been formed by directly admixing a powdered plastic polymer of trifluorochloroethylene with said dispersant and said diluent.

References Cited in the file of this patent

UNITED STATES PATENTS

| Number | Name | Date |
|---|---|---|
| 2,393,967 | Brubaker | Feb. 5, 1946 |
| 2,542,069 | Young | Feb. 20, 1951 |
| 2,542,071 | Sprung | Feb. 20, 1951 |